United States Patent [19]

Hinojosa

[11] 4,394,023

[45] Jul. 19, 1983

[54] HIGH TEMPERATURE VALVE STEM PACKING WITH COILED GRAPHITE SEAL RINGS

[75] Inventor: Alberto L. Hinojosa, Houston, Tex.

[73] Assignee: Daniel Industries Inc., Houston, Tex.

[21] Appl. No.: 427,463

[22] Filed: Sep. 29, 1982

[51] Int. Cl.³ .................. F16K 31/44; F16J 15/12
[52] U.S. Cl. .............................. 277/124; 277/125;
277/105; 277/DIG. 6; 251/214
[58] Field of Search ............... 277/105, 123-125,
277/168, 169, DIG. 6; 251/214

[56] References Cited

U.S. PATENT DOCUMENTS

| 773,949 | 11/1904 | Lockhart | 251/214 X |
|---|---|---|---|
| 2,689,145 | 9/1954 | Magos et al. | 277/105 |
| 4,006,881 | 2/1977 | Gaillard | 251/214 |
| 4,090,719 | 5/1978 | Simanskis et al. | 277/125 |
| 4,157,835 | 6/1979 | Kahle et al. | 277/DIG. 6 X |
| 4,192,519 | 3/1980 | Buggele | 277/124 X |

Primary Examiner—Robert S. Ward, Jr.
Attorney, Agent, or Firm—Gunn, Lee & Jackson

[57] ABSTRACT

A high temperature valve stem packing incorporates a plurality of graphite seal rings composed of spirally coiled graphite tape and metal packing adapter rings being interposed between respective ones of the graphite seal rings. The metal packing adapter rings are of such configuration as to cause structural deformation of the end surface portions of the graphite rings to thereby induce the graphite seal rings to maintain the sealing capability thereof in response to wear during use and in response to fluid pressure applied thereto. In one form of the invention, the packing adapter rings are of solid construction and in another embodiment, the adapter rings are composed of pairs of interfitting rings which cooperate to define packing rings that are capable of yielding in spring-like manner as mechanical force or pressure induced force is transmitted to the packing assembly.

3 Claims, 5 Drawing Figures

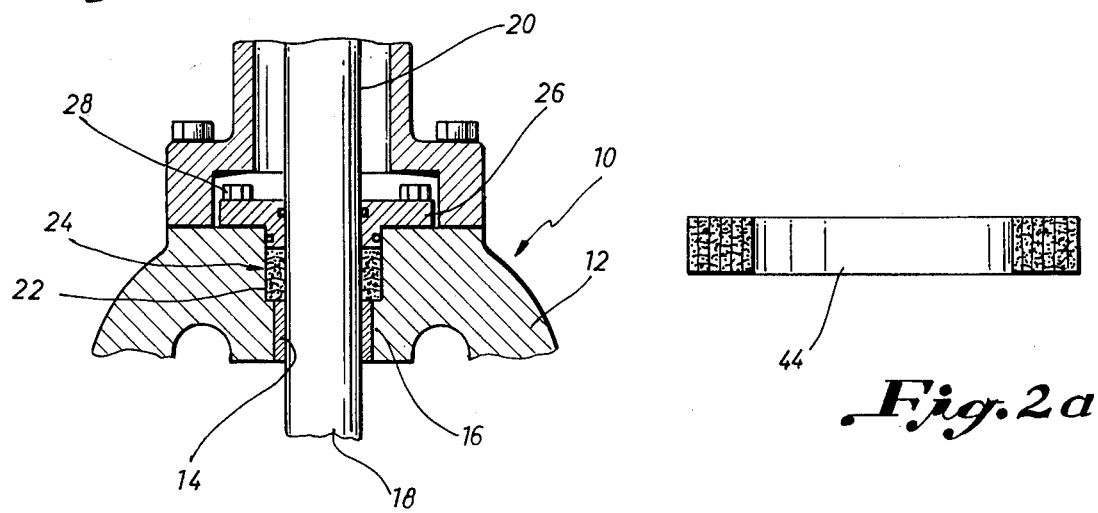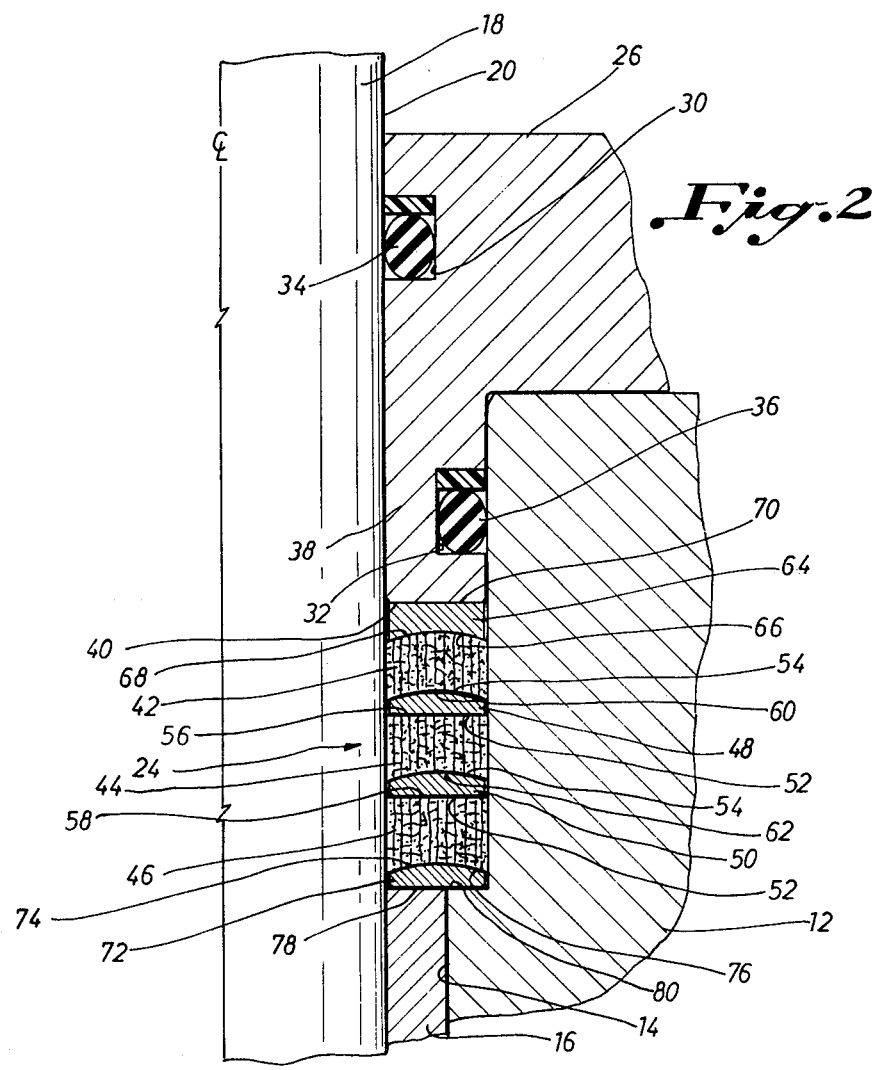

HIGH TEMPERATURE VALVE STEM PACKING WITH COILED GRAPHITE SEAL RINGS

FIELD OF THE INVENTION

This invention relates generally to valves for controlling the flow of fluids and especially to valves that incorporate packing assemblies for establishing a fluid tight seal between a valve body structure and a valve stem for controlling an internal valve element. More specifically, the present invention relates to a packing assembly for valves having the capability of withstanding high temperatures such as might be caused when the valve mechanism is subjected to extreme heat, for example, in case of fires.

BACKGROUND OF THE INVENTION

Virtually all valves for controlling the flow of fluids in piping systems comprise a valve body structure having a valve element therein that is capable of being moved between open and closed positions. In most cases, the valve is provided with a valve stem that extends through the valve body and is connected to the internal valve element. In order to prevent leakage between the valve stem and valve body, the valve mechanism is typically provided with a stem packing assembly that is received within a packing chamber or stuffing box and which encircles the valve stem. Packing assemblies may develop sealing characteristics responsive to application of mechanical pressure thereto or, in the alternative, application of fluid pressure thereto may enhance the sealing capability of such packing assemblies.

Most packing assemblies for valves incorporate sealing materials such as rubber or rubber-like material, plastic, and in many cases lubricant materials. The function of the packing assembly is to completely fill the space between the valve actuator stem and valve body structure to thus prevent liquid or gaseous materials from escaping through the valve stem opening of the valve. The packing assembly must also allow movement of the valve stem, either linearly in the case of gate valves, rotatably in the case of plug valves, and in some cases both linearly and rotatably in the case of lift turn plug valves. Most packing assemblies that are available at the present time, have the capability of achieving adequate sealing capability while at the same time allowing the valve stem freedom of movement for the purpose of valve actuation.

In the petroleum and petrochemical industries, flow lines often transport flammable material that will feed a fire that has become ignited. Where valves are employed to control the flow of such hazardous fluids, it is highly desirable that at least some of the valves have the capability of maintaining effective sealing even under circumstances where the piping system and valve is subjected to extreme external heat such as typically occurs when a fire has become ignited. In most cases, the packing assemblies of valves are incapable of withstanding extreme heat and the sealing materials deteriorate rapidly, thereby allowing leakage past the valve stem packing. Under circumstances where the flow system is maintained under significantly high pressure, the flammable or otherwise hazardous liquid will leak past the packing at a significantly high rate to feed the fire. This is detrimental to fire fighting and to the safety of personnel in the immediate vicinity. If some of the valves of the flow system are provided with packing assemblies that are effectively resistant to extremely high temperatures, these valves may be positioned in the open or closed positions thereof as desired for purposes of efficiency in fighting the fire and for the purposes of safety to personnel. Since the valve stem packing will maintain its sealing capability even when heated to an extremely high temperature, the flammable fluid of the flow line will be effectively controlled at least for a sufficient period of time to allow the fire to be brought under control.

THE PRIOR ART

The problem of valve leakage at high temperatures has been subjected to considerable study in the past and various developments have been made with the view toward provision of a valve packing assembly having the capability of withstanding high temperatures. Graphite is a material that is widely used where high temperatures are concerned because of its capability of effective temperature resistance. For example, U.S. Pat. Nos. 4,006,881 of Gaillard; 4,160,551 of Nixon, et al and 4,190,257 of Schnitzler disclose various valve stem packing materials composed of or including graphite or other such carbonaceous materials. One recent development for high temperature valve stem packing materials, pump seals, etc. is a graphite tape material such as that sold under the registered trademark "GRAFOIL" by Union Carbide Corporation, New York, N.Y. High temperature valve stem packings composed of graphite tape are evidenced by U.S. Pat. Nos. 4,068,853 of Schnitzler, 4,090,719 of Simanskis, et al, and 4,157,835 of Kahle, et al. Also of interest to this invention is U.S. Pat. No. 4,116,451 of Nixon, et al which discloses seal rings incorporating low-friction graphite having a ring of V-shaped spring metal imbedded therein. U.S. Pat. No. 3,512,787 of Kennedy, et al discloses a floating seal packing assembly having spring means to maintain the packing assembly under mechanical compression. U.S. Pat. No. 3,013,830 of Milligan discloses a packing assembly incorporating V-shaped sealing members and packing adapter rings having concave and convex seal engaging surfaces.

SUMMARY OF THE INVENTION

It is a primary object of the present invention to provide a packing assembly for valves having the capability of withstanding extremely high temperatures and maintaining an effective seal at such high temperatures.

It is also a feature of this invention to provide a novel high temperature packing assembly for valves wherein the packing assembly is capable of pressure energization as well as mechanical energization even under high temperature conditions.

It is an even further feature of this invention to provide a novel high temperature packing assembly for valves incorporating graphite seal rings which are effectively capable of being deformed so as to present a concave surface thereof in an upstream direction in regard to pressure.

Among the several objects and features of this invention is contemplated the provision of a novel valve stem packing assembly having the capability of withstanding high temperatures and which is composed at least partially of a plurality of graphite seal rings formed by helically wound graphite tape and deformed endwise to present concave surfaces thereof in an upstream direction in respect to pressure.

It is an even further feature of this invention to provide a novel high temperature valve stem packing assembly incorporating metal packing adapters located between graphite seal rings and having the function of forming the surfaces of adjacent graphite seal rings so as to selectively define concave, planer and convex surfaces at desired portions of the seal rings.

It is also a feature of this invention to provide a novel valve stem packing assembly having packing rings that are capable of yielding in spring-like nature and which also function to form particular surface contours on graphite seal rings in contact therewith.

Briefly, the present invention concerns a valve stem packing assembly which utilizes as the basic sealing components thereof a plurality of graphite seal rings. Each of the graphite seal rings is composed of helically wound graphite tape, thus developing a circular mass of graphite material of sufficient dimension to be received in close fitting relation within a packing chamber or stuffing box defined between the valve stem and valve body structure. Interposed between the graphite seal rings are intermediate packing adapter rings that are also dimensioned to be received in the annular packing chamber or stuffing box of the valve. Each of the intermediate packing adapter rings is formed to define a generally planar surface at the end thereof facing upstream and also defines a circular surface having a convex cross-sectional configuration which deforms the engaging end surfaces of the graphite seal rings to a corresponding circular concave configuration. The packing assembly also incorporates adapter rings that are positioned at the respective ends of the packing assembly. One of these end adapter rings defines a generally planar circular surface that is directed upstream in respect to pressure. This same packing ring also defines a circular convex surface at the opposite end thereof which engages one of the graphite seal rings and forms an end surface of that seal ring to a corresponding concave configuration. At the opposite extremity of the packing assembly is provided an end adapter ring defining a circular concave surface directed upstream toward pressure and being in surface forming contact with one of the graphite seal rings. The opposite end surface of the end adapter ring is of generally planar configuration and is adapted to be engaged by means of a packing retainer that is bolted or otherwise fixed to the valve body structure and secures the packing assembly in its proper position within the packing chamber.

Other and further objects, advantages and features of the present invention will become apparent to one skilled in the art upon consideration of this entire disclosure. The form of the invention, which will now be described in detail, illustrates the general principals of the invention, but it is to be understood that this detailed description is not to be taken as limiting the scope of the present invention.

BRIEF DESCRIPTION OF THE DRAWINGS

So that the manner in which the above recited features, advantages and objects of the present invention are attained and can be understood in detail, more particular description of the invention, briefly summarized above, may be had by reference to the embodiments thereof which are illustrated in the appended drawings, which drawings form a part of this specification.

It is to be noted, however, that the appended drawings illustrate only typical embodiments of the invention and are, therefore, not to be considered limiting of its scope, for the invention may admit to other equally effective embodiments.

In the drawings:

FIG. 1 is a fragmentary sectional view of a valve having retained therein a high temperature packing assembly constructed in accordance with the present invention.

FIG. 2 is a fragmentary sectional view of the structure of FIG. 1 illustrating the high temperature packing assembly in greater detail.

FIG. 2a is a sectional view of a graphite seal ring prior to installation thereof within the valve of FIG. 1.

FIG. 3 is a sectional view of a high temperature valve packing assembly representing a modified embodiment of the present invention.

FIG. 4 is a fragmentary sectional view of a valve mechanism illustrating a high temperature valve stem packing assembly representing a further modified embodiment of the present invention.

DETAILED DESCRIPTION OF PREFERRED EMBODIMENTS

Figure 3:
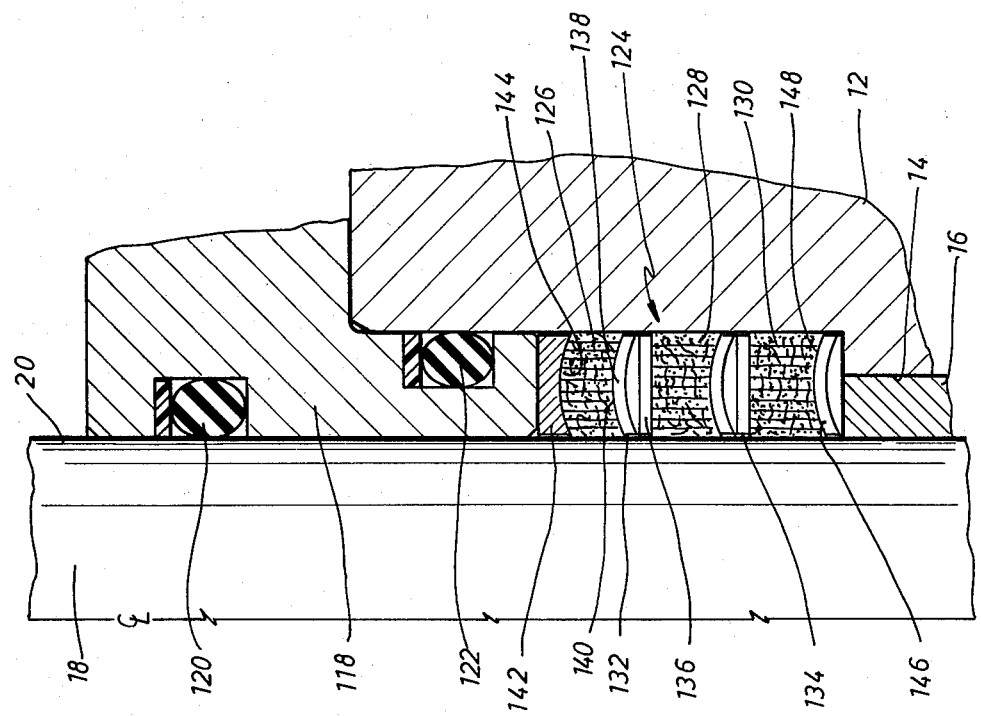

Referring now to the drawings and first to FIG. 1, a valve mechanism illustrated generally at 10 is illustrated in fragmentary section showing a valve body structure 12 having a valve stem passage 14 extending therethrough. Within the valve stem passage 14 is positioned a valve stem bushing 16, such as may be composed of brass or other suitable bearing material, that functions as a guide element for a valve stem member 18. The valve stem 18 defines a cylindrical outer surface 20 which is typically of rather fine surface finish and which may also be capable of passing through a packing assembly if the valve stem has linear movement during valve actuation. The valve stem, for purposes of this invention, may be capable of moving linearly, as in the case of gate valves, rotatably, as in the case of plug valves, or both linearly and rotatably as in the case of lift turn plug valves.

The valve stem passage 14 above the bushing 16 is enlarged so as to define an annular packing chamber or stuffing box 22 about the valve stem 18. Within the packing chamber 22 is located a packing assembly shown generally at 24 which is retained within the packing chamber by means of a packing retainer element 26. The packing retainer is secured in assembly with the valve body structure 12 by means of bolts 28 or by any other suitable form of retention.

Referring now to FIG. 2, the packing retainer 26 is formed to define internal and external seal grooves 30 and 32 respectively within which are received annular sealing elements 34 and 36 which may conveniently take the form of elastomeric O-rings or any other suitable form of sealing element. Sealing element 34 is adapted to maintain a fluid tight seal between the packing retainer 26 and the cylindrical surface 20 of the valve stem 18. The sealing element 36 maintains a positive seal between the packing retainer element 26 and the valve body 12 at the enlarged upper portion of the valve stem passage surface 14.

The packing retainer 26 defines an annular, generally cylindrical retainer rim portion 38 within which the seal groove 32 is formed. The free extremity of the packing retainer rim 38 defines a generally circular surface 40 of planer configuration. It should be borne in mind that the particular configuration of the planer surface 40 is not critical to the present invention. The surface 40 may be of any other suitable configuration mating with the configuration of the packing adapter ring in engagement therewith.

The packing assembly 24 is a high temperature packing assembly that is capable of maintaining a sealed relationship between the valve body structure and the valve stem even under circumstances where the valve is subjected to extremely high temperatures such as in the event of a fire. The packing assembly incorporates a plurality of graphite seal rings, three of which are shown at 42, 44 and 46. Each of the seal rings 42-46 are formed of graphite tape material which is helically wound to form a seal ring of the configuration illustrated in FIG. 2a. Graphite tape material such as that manufactured by the Union Carbide Corporation, New York, N.Y. and sold under the registered trademark "GRAFOIL" is utilized in the formation of the seal rings. As shown in FIG. 2a, the annular sealing element is in the form of a circular sealing ring composed of a number of graphite tape laminations that are formed such as by winding the tape about a mandrel that is of substantially the same outer diameter as the outer diameter of the valve stem 18. When originally wound, the graphite tape seal ring will have a generally rectangular cross-sectional configuration as shown in FIG. 2a. The laminations of the seal ring will be substantially parallel with an axis or center line extending through the center of the central opening 44 defined thereby. This axis or center line will be coincident with the center line of the valve stem 18 when the packing ring is installed within the packing chamber of stuffing box of the valve. Upon assembly of the seal ring within the stuffing box the laminations will be caused to slip, thus changing the seal ring from the rectangular cross-sectional configuration of FIG. 2a to the configuration of FIG. 2.

It should be borne in mind that although three graphite seal rings 42-46 are illustrated in FIG. 2, it is not intended thereby to limit the present invention to utilization of any particular number of graphite seal rings. For example, the packing assembly 24 may incorporate one or more such graphite seal rings within the spirit and scope of this invention.

Interposed between adjacent graphite seal rings are metal packing adapter rings, two of which are shown at 48 and 50. The packing adapter rings 48 and 50 are of substantially identical configuration defining generally planar circular surfaces 52 that are directed upstream in respect to pressure. Each of the packing adapter rings also define a circular surface of convex configuration as shown at 54 which is directed downstream in respect to pressure. The planar surfaces 52 of each of the packing adapter rings engage respective end surfaces 56 and 58 of the graphite seal rings 44 and 46 respectively. Since the surfaces 52 of the packing adapter rings are of planar configuration, they will mate with the planar end surfaces 56 and 58 of the graphite seal rings 44 and 46. The convex surfaces of the packing adapter rings 48 and 50 function to deform respective end surfaces of the graphite seal rings 42 and 44 to thus form corresponding concave circular end surfaces as shown at 60 and 62. The concave surfaces 60 and 62 are oriented facing upstream in respect to the pressure controlled by the valve. By forming the graphite seal rings in this manner, the inner and outer peripheral surfaces are forced to fit closely with respect to the metal surfaces of the valve body stem passage and the valve stem.

The outer portion of the packing assembly is defined by an outer adapter ring 64 which is also formed of metal and which defines a circular concave surface 66 having mating engagement with a convex surface 68 defined by the outer end surface of the graphite seal ring 42. Thus, both the inner and outer end surfaces of the graphite seal ring 42 are of curved cross-sectional configuration, the inner surface 60 being of concave configuration while the outer surface 68 thereof is of convex configuration. The outer end surface 70 of the packing adapter ring 64 is of planar configuration, thus mating with the planer configuration 40 defined by the inner end portion of the packing retainer rim 38.

The inner end portion the the packing assembly 24 is defined by an inner packing adapter ring 72 defining a convex outer surface 74 having mating engagement with a concave inner end surface 76 defined by the inner end portion of the graphite seal ring 46. Thus, each of the seal rings 42, 44 and 46 define concave circular end surfaces that face in the direction of pressure, providing each of the seal rings with the capability of expansion to urge the inner and outer peripheral surfaces thereof into optimum sealing engagement with the metal surfaces defining the packing chamber. The inner end surface 78 of the packing adapter 72 is of planar configuration and is adapted to be seated against an annular shoulder surface 80 defining the inner extremity of the packing chamber. The inner packing ring 72 is shown to be of substantially identical configuration as compared to the packing adapter rings 48 and 50. If desired, however, the inner extremity of the packing adapter ring 72 may take any other suitable configuration without departing from the spirit and scope of this invention. It is only necessary that the outer end surface 74 thereof be of convex configuration thus forming the inner end surface 76 of the seal ring 46 to a corresponding concave configuration.

It may be desirable to provide a high temperature packing assembly of the general nature as shown in FIG. 2, but to additionally provide the packing assembly with a spring-like characteristic. This feature is accomplished in the manner set forth in FIG. 3 which illustrates a packing assembly generally at 82 which is retained within a packing chamber by means of a packing retainer 84. The packing retainer is of substantially identical configuration with the packing retainer 26 of FIG. 2 and incorporates sealing members 86 and 88 to seal the packing retainer with respect to the valve stem 18 and the valve body structure 12. The packing assembly 82 incorporates a plurality of graphite seal rings 90, 92 and 94 which are of similar configuration as compared to the seal rings 42, 44 and 46 of FIG. 2. The inner and outer packing adapter rings 96 and 98 may be substantially identical with the respective packing adapter rings of FIG. 2. The intermediate packing adapter rings are each formed by packing ring assemblies including inner rings 100 and 102 of substantially flat configuration defining circular shoulders 104 and 106 at the respective inner peripheries thereof. A pair of spring ring elements 108 and 110 are placed in assembly with the flat rings 100 and 102 with the inner peripheries of the respective spring rings being in abutment with the circular shoulders 104 and 106. Each of the spring rings 108 and 110 is formed of sheet metal having spring characteristics, which sheet metal is in arcuate cross-sectional form defining convex outer surfaces 112 and 114 respectively. These convex outer surfaces are positioned in engagement with corresponding concave inner surfaces of the graphite seal rings 90 and 92 respectively. Since the outer surface 116 of the inner packing adapter ring 96 is of convex configuration, it should be observed that the inner end surfaces of each of the seal rings 90, 92 and 94 is of corresponding concave cross-sectional configuration.

As mechanical pressure is applied to the packing assembly, either by mechanical means forcing the packing adapter 84 in the direction of the packing assembly or fluid pressure acting against the inner end portion of the packing assembly, the packing assembly can yield in columnar manner. The spring-like intermediate packing adapter ring assemblies will yield by virtue of the spring nature of the curved spring elements 108 and 110. This feature provides the packing assemblies with the ability to compensate for mechanical tolerances and to yield in response to pressure increase. The packing adapter rings, including the intermediate ring assemblies, cooperate to maintain the inner extremities of the graphite seal rings in the proper arcuate concave configuration for optimum sealing capability. As packing wear occurs, the arcuate upper surfaces of each of the adapter rings causes the seal rings to deform in radial manner, thereby insuring optimum sealing relationship thereof with the respective metal surfaces of the valve body and valve stem.

Figure 4:
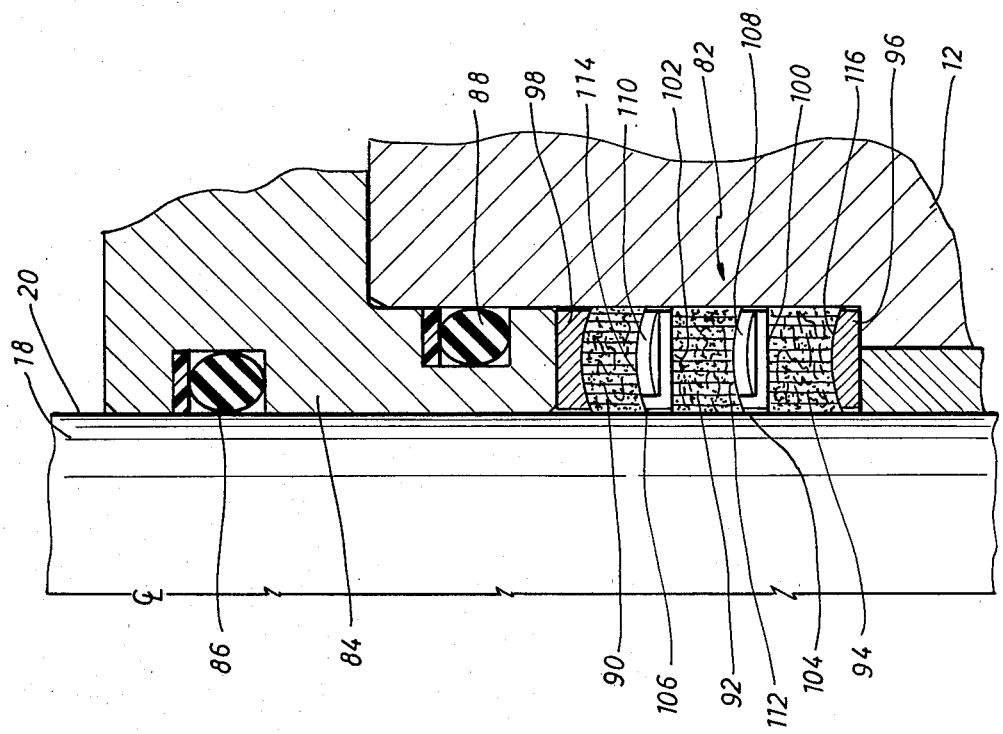

A spring-like graphite packing assembly may also conveniently take the form shown in FIG. 4. A packing retainer element 118, having sealing members 120 and 122 located in annular grooves formed therein, functions to retain a packing assembly within a packing chamber defined by the cooperative relationship of the valve stem 18 with the valve body structure 12. The packing assembly which is illustrated generally at 124 includes graphite seal rings 126, 128 and 130 which are of the same structure and configuration as compared with the seal rings 90, 92 and 94 of FIG. 3. Packing adapter assemblies are positioned between adjacent seal rings such as shown at 132 and 134. Each of the packing adapter assemblies includes an inner ring element such as shown at 136 of generally flat configuration and an outer ring 138 of arcuate configuration, defining a convex outer surface 140 that engages the inner extremity of the adjacent graphite seal ring 126 or 128. An outer packing adapter ring 142 is generally identical with the outer packing adapter ring 98 of FIG. 3 and defines a circular surface 144 of concave configuration which engages the outer end surface of the outer seal ring 126 and thus maintains each extremity of the seal ring 126 in arcuate configuration, the inner end surface being of concave configuration while the outer end surface is of convex configuration.

At the inner end portion of the packing assembly 124 is provided an inner packing adapter ring 146 which is of arcuate configuration, defining a convex outer surface 148 which is in engagement with the inner end surface of the graphite seal ring 130. In each case, the arcuate packing adapter rings of the adapter ring assemblies or of the inner adapter ring are formed of metal having spring-like characteristics. This feature allows the packing assembly to be compressed somewhat by the packing retainer element 118. As wear occurs in the packing assembly, the spring-like members will maintain a spring force on the respective graphite seal rings, thus maintaining the degree of seal ring compression that is desirable for maintaining optimum sealing capability.

Regardless of the embodiment involved, application of extreme heat to the packing assemblies will not cause leakage to occur. Even though the O-ring type sealing elements of the packing retaining element will fail quite readily under intense heat, nevertheless, the graphite material of the graphite seal rings will efficiently maintain the respective sealing capability thereof. Any leakage that might occur will be insufficient to feed a fire and, therefore, fire fighting personnel will be enable to effectively control the fire. The high temperature packing assembly of this invention is, therefore, well adapted to attain all of the objects and features herein above set forth, together with other features which are inherent in the packing assembly itself. It will be understood that certain combinations and subcombinations are of utility and may be employed without reference to other features and subcombinations. This is contemplated by and is with the scope of the present invention.

What is claimed is:

1. A high temperature stem packing assembly for valves, comprising:
   (a) a plurality of graphite seal rings composed of spirally coiled graphite tape originally coiled in such manner as to form generally planar circular end surfaces;
   (b) metal packing adapter ring means being interposed between each of said graphite seal rings, said packing adapter ring means defining convex circular end surface means at one end thereof and planar circular end surface means at the opposite end thereof, said convex circular end surface means deforming the end surface of the seal ring in contact therewith from said originally generally planar circular surface configuration to a corresponding concave configuration mating with said convex circular surface of said adapter ring means.

2. A high temperature stem packing assembly as recited in claim 1, wherein said packing assembly includes:
   metal end packing adapter ring means being positioned at respective ends of said packing assembly, one of said end packing adapter rings defining a circular surface of concave configuration being in deforming contact with an end surface of one of said graphite seal rings, the other of said metal packing adapter ring means defining a circular surface of convex configuration being in deforming contact with an end surface of another one of said graphite seal rings.

3. A high temperature stem packing assembly as recited in claim 2, wherein:
   said graphite seal rings are each deformed by said packing adapter rings and end packing adapter rings so as to present circular concave end surfaces thereof directed upstream in respect to fluid pressure.

* * * * *